US008240193B2

(12) United States Patent
Frauhammer et al.

(10) Patent No.: US 8,240,193 B2

(45) Date of Patent: Aug. 14, 2012

(54) METHOD FOR OPERATING A SENSOR

(75) Inventors: Joerg Frauhammer, Gemmrigheim (DE); Robert Seyfang, Ingersheim (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 12/645,711

(22) Filed: Dec. 23, 2009

(65) Prior Publication Data

US 2010/0242584 A1 Sep. 30, 2010

(30) Foreign Application Priority Data

Mar. 31, 2009 (DE) ........................ 10 2009 002 037

(51) Int. Cl.
*G01M 15/10* (2006.01)

(52) U.S. Cl. .................................................. 73/114.69

(58) Field of Classification Search ................. 73/23.31, 73/114.69, 114.71, 114.73

See application file for complete search history.

(56) References Cited

U.S. PATENT DOCUMENTS

| | | | | |
|---|---|---|---|---|
| 5,327,780 | A * | 7/1994 | Entenmann et al. | 73/114.73 |
| 5,845,489 | A * | 12/1998 | Dohta et al. | 60/276 |
| 5,969,230 | A * | 10/1999 | Sakai et al. | 73/23.31 |
| 6,164,125 | A * | 12/2000 | Kawase et al. | 73/114.73 |
| 6,381,953 | B1 * | 5/2002 | Glugla et al. | 60/284 |
| 6,681,563 | B2 * | 1/2004 | Glugla et al. | 60/285 |
| 6,711,932 | B2 * | 3/2004 | Iwazaki et al. | 73/1.06 |
| 7,654,133 | B2 * | 2/2010 | Hoshi et al. | 73/114.32 |
| 2003/0005746 | A1 * | 1/2003 | Iwazaki et al. | 73/1.06 |

* cited by examiner

*Primary Examiner* — Freddie Kirkland, III

(74) *Attorney, Agent, or Firm* — Kenyon & Kenyon LLP

(57) ABSTRACT

A method for operating a sensor in an exhaust gas tract of an internal combustion engine and a device for carrying out the method are provided. In the method, a diagnosis is carried out of the condition of the saturation temperature, exclusively while taking into consideration a few fundamental input variables characterizing the operating state of the internal combustion engine.

20 Claims, 2 Drawing Sheets

METHOD FOR OPERATING A SENSOR

FIELD OF THE INVENTION

The present invention relates to a method for operating a sensor in an exhaust gas tract of an internal combustion engine, a device for carrying out the method and a computer program as well as a computer program product.

BACKGROUND INFORMATION

When Diesel fuels and Otto fuels, that are made up of a mixture of hydrocarbons are combusted, some hydrocarbons still remain in the exhaust gas, even after the combustion. To reduce the emission, upper boundaries are fixed, which limit the emission of volatile hydrocarbons.

GARB legislation (GARB: California Air Resources Board), for instance, requires the monitoring of controller functions of the fuel system. One requirement in this connection is the diagnosis of the time to achieving readiness for operation (TTCL: time-to closed loop). Alternatively, it is possible to monitor individually all activating conditions for the controller function, so that an indirect diagnosis comes about for achieving readiness for operation of the regulation.

The condition of saturation temperature is calculated in the engine control based on numerous input variables, the purpose being to hit as exactly as possible the point in time of achieving the condition of saturation temperature, and thereby to bring about the readiness for operation of the exhaust gas sensor. This is required particularly in the case of heated exhaust gas sensors which are sensitive to droplets and spray water. In this context, input variables are used which have not been sufficiently diagnosed within the meaning of the legislation.

SUMMARY OF THE INVENTION

The method provided is used for operating a sensor in an exhaust gas tract of an internal combustion engine, in which a diagnosis is carried out for the condition of the saturation temperature, taking into account the operating state of the input variables characterizing the internal combustion engine.

Consequently, a diagnosis is provided for achieving saturation temperature condition for exhaust gas sensors in the exhaust gas tract of an internal combustion engine. In this way it is possible to keep to the legal requirements for the diagnosis of the TTCL for control systems in the fuel system, based on heated exhaust gas sensors that are sensitive to spray water.

In the embodiment it is provided that the diagnosis is carried out in addition to making a calculation of the condition of the saturation temperature. In this case, the condition saturation temperature is typically calculated in the engine control, based on a plurality of input variables. In this way, achieving the saturation temperature should be met exactly, in order to bring about the readiness for operation as early as possible. Now, it is provided that a diagnosis be carried out, in addition to the calculation in which variables may even be used which are not sufficiently diagnosed within the meaning of the legislation, in which only a few fundamental variables are used that characterize the operating state.

If the diagnosis gives a result that deviates from the calculation, this is indicated in a suitable manner, for instance, by emitting a warning.

In one embodiment of the method, at least one of the variables rotational speed, fuel injection quantity and exhaust gas mass flow is used as the input variable.

Furthermore, a modeled temperature in the exhaust gas tract may be calculated as an internal state variable based on the input variables, on which the diagnosis for the saturation temperature is then based.

In another embodiment, based on the input variables, a measured value of a temperature sensor in the vicinity of the sensor is diagnosed via a plausibility observation, so that the measured value may be used for the diagnosis of the saturation temperature.

The method may also be used for the diagnosis of an SCR system (SCR: selective catalytic reduction). For the metering of an SCR system, too, there is a requirement for monitoring the time to metering enabling (time to closed loop, TTCL).

Comparable to the enabling of a broadband lambda probe (LSU: lambda sensor universal), several input variables are used which, either individually or in common have to be monitored in the form of a monitoring of the enabling bit itself. In this connection, a redundant enabling condition may be calculated which is still only based on sufficiently diagnosed input variables, such as the rotational speed, injection quantity and temperature upstream of the SCR. If the measured temperature is used by the SCR, this, in turn must be sufficiently monitored. In an alternative embodiment, if a model of this temperature is used, this monitoring may be omitted.

Moreover, a device for operating a sensor in an exhaust gas tract of an internal combustion engine having an electronic computer unit is provided, which is particularly provided to carry out an abovementioned method. The device is developed to carry out a diagnosis of the condition of the saturation temperature, exclusively while taking into consideration a few fundamental input variables characterizing the operating state of the internal combustion engine.

The computer program described includes program code means to implement all the steps of a method discussed above, if the computer program is run on a computer or a corresponding processing unit, particularly in a device that was described.

The computer program product has these program code means that are stored on a computer-readable storage medium.

Consequently, the present invention enables making a diagnosis of the saturation temperature condition for exhaust gas sensors in the exhaust gas tract of an internal combustion engine, taking into account the operating states of the internal combustion engine assumed during the operating phase after the start. As the input variables, normally only a few fundamental variables that characterize the operating state are used, such as the rotational speed, the fuel injection quantity and the exhaust gas mass flow, which, on their part, have been sufficiently diagnosed.

The method makes possible a diagnosis of the saturation temperature condition for exhaust gas sensors in the exhaust gas tract of an internal combustion engine, which is based on a few input variables that themselves have been sufficiently diagnosed, and which is able sufficiently accurately to render plausible the normal calculating function for the saturation temperature. For this purpose, the system state of the saturation temperature is characterized by another sufficiently diagnosed system state, and sufficient criteria are formulated so that if one keeps to them, one may assume that the saturation temperature has been reached.

DETAILED DESCRIPTION

Figure 1:
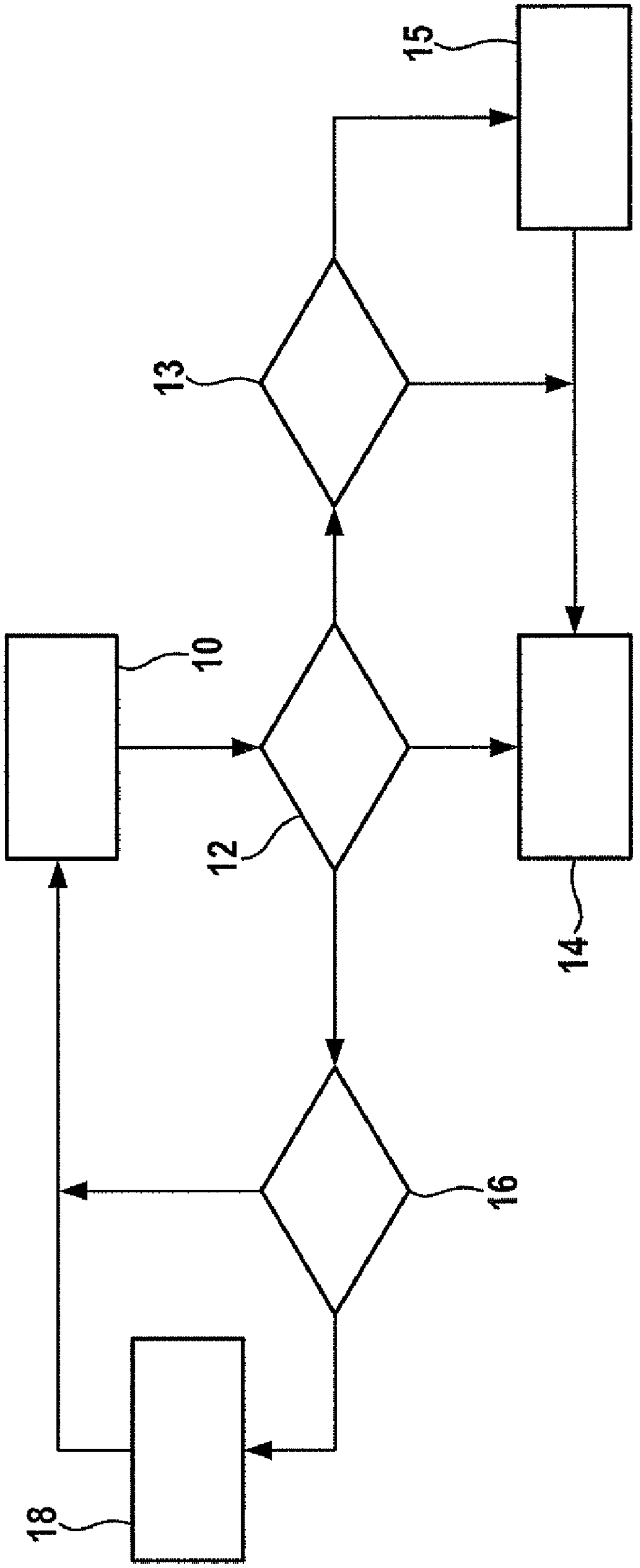
FIG. 1 shows an embodiment of the method according to the present invention.

Different states are shown in FIG. 1. In a first state 10, the heating device of a broadband lambda probe is switched off, at the start of the internal combustion engine, since the condition saturation temperature has not yet been reached. In a next step 12 it is calculated whether this condition has been satisfied. For this purpose, rotational speed n, fuel injection quantity q, exhaust gas mass flow dm, the temperature in the exhaust manifold T3, the external temperature Ta and additional variables are drawn upon as input variables.

If, at 12, the calculation yields that the condition for the saturation temperature is not satisfied, a diagnosis is carried out in a second step 16, for the condition of the saturation temperature. For this, only sufficiently diagnosed input variables are used, such as rotational speed n, fuel injection quantity q, exhaust gas mass flow dm and the temperature in exhaust gas manifold T3. Thus, the determination of plausibility of the calculation in 12 is carried out based on a few fundamental input variables.

If the diagnosis at 16 yields that the condition is not satisfied, the heating device remains switched off (state 10). However, if it is determined in 16 that the condition has already been fulfilled, the deviation of the calculation function from the expected performance characteristics is detected and is indicated, for instance, by a warning light for a malfunction (MIL: malfunction indication light) (state 18).

If the calculation at 12 yields that the saturation temperature condition is satisfied, it is then checked in a further state 13 whether the diagnosis function had already detected a deviation of the calculation function from the expected performance characteristics. If this did not happen, the diagnosis determines the OK state (state 15). Subsequently, in a state 14, the heating device of the LSU is switched on, since the LSU may then be operated without the danger that it might be damaged by spray water or droplets.

In this way it is ensured that the LSU goes into operation at as early as possible a time directly after fulfilling the condition for the saturation temperature, and that a malfunction, which would prevent this, is detected and indicated.

Figure 2:
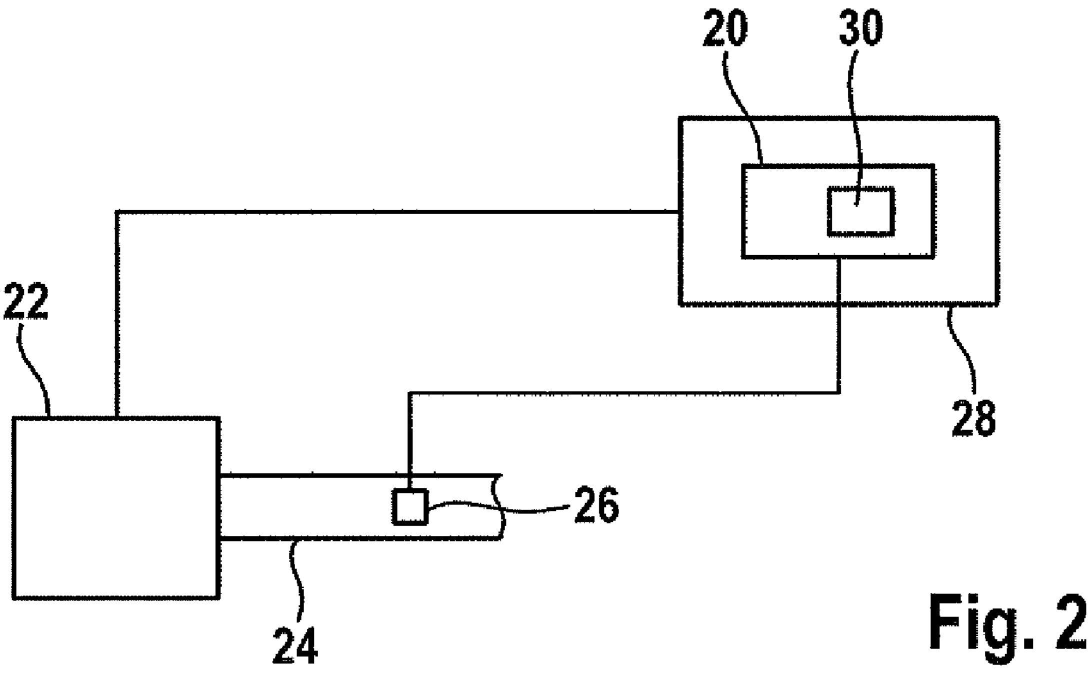
FIG. 2 shows an embodiment of the device according to the present invention.

FIG. 2 schematically reproduces a device for carrying out the method, and it is marked by reference numeral 20. The illustration shows an internal combustion engine 22 having an exhaust gas tract 24 in which sensor 26 is situated. An engine control 28 is provided for controlling internal combustion engine 22, in which device 20 is made available.

An electronic computing unit 30 for carrying out the required calculations, within the scope of the diagnosis, is provided in device 20. For this purpose, the necessary input variables are made available to device 20.

What is claimed is:

1. A computer-implemented method for operating a sensor in an exhaust gas tract of an internal combustion engine, having at least one computer processor for operating the sensor, the method comprising:
- making an estimate of a saturation temperature, based on input variables and correction factors;
- obtaining input variables characterizing an operating state of the internal combustion engine; and
- carrying out a plausibility diagnosis of the saturation temperature estimate, taking into account the input variables characterizing an operating state of the internal combustion engine.

2. The method according to claim 1, wherein a deviation in the calculation from normal performance characteristics is indicated by the diagnosis.

3. The method according to claim 2, wherein the deviation is indicated by a warning light.

4. The method according to claim 1, wherein at least one of the following input variables is used as the input variables of the diagnosis: a rotational speed, a fuel injection quantity, and an exhaust gas flow.

5. The method according to claim 1, further comprising:
- calculating a modeled temperature in the exhaust gas tract as an internal state variable, based on the input variables.

6. The method according to claim 1, further comprising:
- diagnosing a measured value from a temperature sensor situated in a vicinity of the sensor via a determination of plausibility based on the input variables.

7. The method according to claim 1, wherein the diagnosis is of an SCR system.

8. The method according to claim 1, wherein a heating device is activated or remains deactivated based on the diagnosis.

9. The method according to claim 1, wherein the input variables are monitored in the form of a monitoring of an enabling bit.

10. The method according to claim 1, wherein a redundant enabling condition is calculated which is still only based on sufficiently diagnosed input variables.

11. The method according to claim 1, wherein a deviation in the calculation from normal performance characteristics is indicated by the diagnosis, and wherein at least one of the following input variables is used as the input variables of the diagnosis: a rotational speed, a fuel injection quantity, and an exhaust gas flow.

12. The method according to claim 11, wherein a heating device is activated or remains deactivated based on the diagnosis, and wherein the deviation is indicated by a warning light.

13. The method according to claim 11, wherein the input variables are monitored in the form of a monitoring of an enabling bit.

14. The method according to claim 11, wherein a redundant enabling condition is calculated which is still only based on sufficiently diagnosed input variables.

15. The method according to claim 1, further comprising:
- calculating a modeled temperature in the exhaust gas tract as an internal state variable, based on the input variables; and
- diagnosing a measured value from a temperature sensor situated in a vicinity of the sensor via a determination of plausibility based on the input variables.

16. The method according to claim 15, wherein the diagnosis is of an SCR system.

17. The method according to claim 15, wherein the input variables are monitored in the form of a monitoring of an enabling bit.

18. The method according to claim 15, wherein a redundant enabling condition is calculated which is still only based on sufficiently diagnosed input variables.

19. A device for operating a sensor in an exhaust gas tract of an internal combustion engine, comprising:
- an arrangement for carrying out a diagnosis of a condition of a saturation temperature, taking into consideration input variables characterizing an operating state of the internal combustion engine;
- wherein the arrangement is configured to make an estimate of the saturation temperature.

20. A non-transitory computer-readable medium containing a computer program, which is executable by a processor, the method comprising:
- a program code arrangement having program code for operating a sensor in an exhaust gas tract of an internal combustion engine, by performing the following:
- obtaining input variables characterizing an operating state of the internal combustion engine; and
- carrying out a diagnosis of an estimate of a saturation temperature, taking into account the input variables characterizing an operating state of the internal combustion engine.

* * * * *